United States Patent [19]
Freed

[11] 3,802,083
[45] Apr. 9, 1974

[54] MARKER AND STOP ACCESSORY FOR EXTENSIBLE MEASURING TAPES

[76] Inventor: Marvin J. Freed, 8 Levitan St., Ramat Aviv, Tel Aviv, Israel

[22] Filed: Mar. 17, 1972

[21] Appl. No.: 235,667

[52] U.S. Cl. .................................. 33/138, 33/189
[51] Int. Cl. .................................................. G01b 3/10
[58] Field of Search......... 33/138, 137 R, 189, 27 C

[56] References Cited
UNITED STATES PATENTS

| | | | |
|---|---|---|---|
| 2,624,120 | 1/1953 | Mills | 33/189 |
| 2,906,024 | 9/1959 | Smith | 33/27 C |
| 3,336,678 | 8/1967 | Chamberlain et al. | 33/138 |
| 3,577,641 | 5/1971 | Smith | 33/138 |

Primary Examiner—Robert B. Hull
Assistant Examiner—Richard R. Stearns
Attorney, Agent, or Firm—Benjamin J. Barish

[57] ABSTRACT

A marker and stop accessory for an extensible measuring tape comprises a housing adapted to be fixed to the tape casing adjacent to the tape-issuing opening, and an operator spring-mounted within the housing. The lower end of the operator carries a marking element adapted, when the operator is depressed, to engage and mark the article being measured; and the side of the operator carries a stop element in the shape of a pointer adapted to engage the tape when the operator is depressed to indicate the length of the issued tape as well as to arrest any further movement of the tape.

9 Claims, 4 Drawing Figures

PATENTED APR 9 1974 3,802,083

MARKER AND STOP ACCESSORY FOR EXTENSIBLE MEASURING TAPES

BACKGROUND OF THE INVENTION

The present invention relates to extensible measuring tapes, and particularly to a marker and stop accessory for such tapes. While the invention is particularly suited for use as an attachment to existing measuring tapes, it will be appreciated that it may also be constructed integrally with the casing for the measuring tape.

Many forms of extensible measuring tapes are known wherein the tape is disposed in coiled form in a casing and is issuable through an opening in the casing for measuring an article. In using such a measuring tape, it frequently becomes necessary to mark the measurement on the article, for example the length of fabric to be cut or the dimension of a workpiece to be worked. The user must hold the tape so that further issuance thereof is arrested, and at the same time he must mark the article according to the measured length. A number of marker attachments have been proposed for measuring tapes to facilitate this operation, but such attachments have not found wide-spread use because, as a rule, they are of complicated and expensive construction, and/or are inconvenient to use.

SUMMARY OF THE INVENTION

The present invention provides a simple and inexpensive accessory for extensible measuring tapes which enables the user to conveniently mark the measurement on the article being measured and/or stop the measuring tape at a predetermined length.

According to a broad aspect of the invention, the novel accessory includes a movable operator carrying a tape stop element to overlie the tape issuing from the casing opening, the operation further including a marker element to overlie the article being measured. A spring mounting is provided for the operator to urge same to its upper position, the operator being depressable against the spring to a lower position to bring the stop element into engagement with the tape and the marker element into engagement with the article being measured.

According to a further feature, the stop element is in the shape of a pointer whereby it indicates the length of tape issuing from the casing opening, and also stops any further movement of the tape.

According to still further features, the accessory includes a housing adapted to be fixed to the casing adjacent to the tape opening, the operator being reciprocatingly disposed within the housing and urged to its upper position by the spring. The housing is formed with an open bottom through which the marker element projects in the depressed position of the operator, and with a slotted side through which the stop element moves as the operator is depressed.

According to a still further feature, the operator includes a latch cooperable with the housing for retaining the operator in its depressed position.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 3:
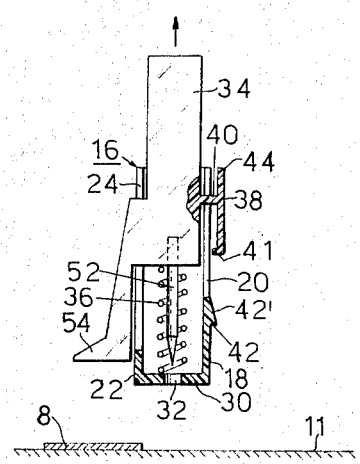
FIG. 3 is a partial sectional view of the accessory of FIGS. 1 and 2 with the operator in its upper or inactive position.
Figure 4:
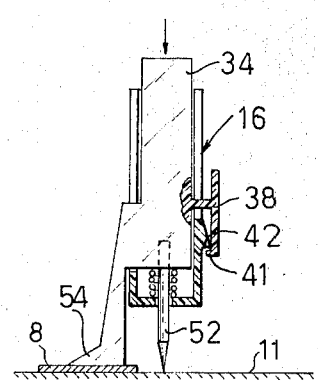
FIG. 4 is a view like that of FIG. 3 but with the operator in its depressed or active position.

The novel marker and stop accessory illustrated in the drawings is generally designated 2. It is attached to an extensible measuring tape 4 of known construction which includes a casing 6 containing the extensible measuring tape 8 issuable through an opening 10 in the casing for measuring an article 11 (FIGS. 3, 4).

The novel accessory 2 includes an arm 12 adapted to be fixed to the tape casing 6 by any suitable means, such as by adhesive 14. For this purpose, the inner face (the face not shown in FIG. 1) may carry an adhesive tape having the adhesive coating 14 protected by a liner which is stripped away when the accessory is to be attached to the measuring tape casing. Such an arrangement provides a simple, inexpensive, and almost universally-applicable attachment for measuring tapes of different dimensions, but it will be appreciated that other forms of attachments could also be used.

One end of arm 12 carries a housing 16 which is disposed adjacent to and laterally of the tape-issuing opening 10. One side wall 18 of the housing is formed with a slot 20 starting from its upper end, and the opposite side wall 22 is formed with another slot 24 starting from its upper end but longer than slot 20. The bottom wall 30 of housing 16 is formed with a central opening 32.

Slidably disposed within housing 16 is a button operator 34 which is urged to an upper position by a spring 36 interposed between its lower surface and the bottom wall 30 of the housing. Operator 34 is thus movable generally orthogonal to the direction of tape issuance. It carries a tab 38 connected intermediate its ends by means of a flexible and resilient web 40. The upper end of slot 20 through which web 40 passes is of reduced width to define shoulders 20' engagable by web 40 for limiting the upper position of operator 34.

The lower end of tab 38 is formed with a latching element 41 adapted to engage a shoulder 42 formed on wall 18 of housing 16 for latching operator 34 in its depressed position. For this purpose, shoulder 42 is formed with a cam face 42' engagable with latching element 41 upon depression of the operator, to flex the latching element outwardly until it snaps below shoulder 42, thereby to latch the operator in its depressed position. To release the operator, the upper end 44 of tab 38 is pressed inwardly which, by the inherent resiliency of web 40, moves latching element 41 out of engagement with shoulder 42, whereby the operator 34 is returned to its normal upper position under the influence of spring 36.

The lower end of operator 34 is formed with a blind bore for receiving a marking element, such as a steel point or a stick of marking lead 52. Upon depression of operator 34, the marker lead 52 passes through opening 32 of housing 16 to engage the article being measured.

Operator 34 carries, at its side, a stop element 54 which projects through slot 24 of housing wall 22 to overlie the tape 8 issuing from the casing. Stop element 54 is in the shape of a pointer or arrow so that when operator 34 is depressed, the lower surface of the stop element engages tape 8 to indicate the length of the tape issued from casing 6 and also to stop the further issuance of the tape.

In use, operator 34 is normally in its upper inactive position (FIG. 3) wherein marker lead 52 is out of engagement with the article 11 being measured, and the pointer-stop element 54 is out of engagement with the tape 8 issuing from casing 6. The tape may therefore be extended from casing 6 until the desired length of tape has been issued. When this occurs, operator 34 is depressed and is latched in its depressed condition by latching element 41 engaging housing shoulder 42 (FIG. 4). In this depressed position of the operator the lower surface of the pointer-stop element 54 engages the tape 8 thereby arresting any further issuance of the tape and also indicating the issued length of tape; also, the marker lead 52 simultaneously engages the article 11 being measured, and thereby applies a mark to that article according to the predetermined length indicated by the tape measure.

Latch 41 may be retained in its latched position. To release the latch, the upper part 44 of tab 38 is pressed inwardly, whereby latching element 41 is moved outwardly out of engagement with housing shoulder 42, permitting the operator 34 to return to its normal upper position under the influence of spring 36.

If manual locking is desired, web 40 may be of reduced thickness to make it flexible but non-resilient, whereby to lock the operator to its lower position it is necessary to manually press the lower end of tab 38 to bring latching element 41 into enagement with shoulder 42.

Figure 1:
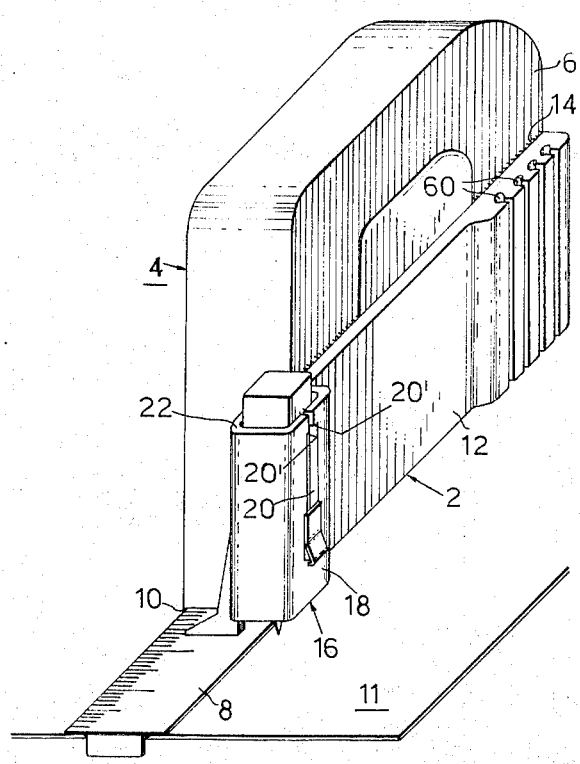
FIG. 1 is a perspective view of a measuring tape including a marker and stop accessory therefor constructed in accordance with the invention.
Figure 2:
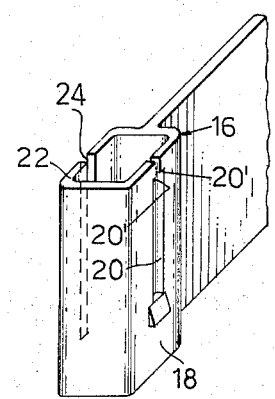
FIG. 2 is a perspective view of one of the main elements of the accessory of FIG. 1.

Arm 12 of the accessory is illustrated in FIG. 1 as being formed with a plurality of cylindrical recesses or compartments 60 for receiving spare marker leads. A steel point could also be included for use as the marker element.

The illustrated accessory may be manufactured inexpensively since it includes only two main parts, namely housing 16 and operator 34, each of which may be made in volume and at low cost by injection moulded plastic.

Many modifications and variations will be apparent. For example, the latching arrangement including elements 41 and 42 may be omitted. Further, the stop element 54 may be omitted, whereby the accessory would be used only as a marking device, or the marking element could be omitted whereby the accessory would be used as a tape stop device. Further, other means of attaching the device could be used and it is contemplated that the accessory could be constructed integrally with the casing 6 for the tape, as indicated earlier.

Many other modifications, variations and applications of the illustrated embodiment will be apparent.

What is claimed is:

1. An accessory for an extensible measuring tape contained in a casing, which tape is issuable through an opening in the casing for measuring an article, said accessory comprising: a housing adapted to be fixed to the casing adjacent to the tape opening, an operator slideably disposed within the housing for movement generally orthogonal to the direction of tape issuance, spring means disposed within the housing and engaging the operator for urging same to an upper position within the housing, said operator carrying at its lower end a tape stop element to overlie the tape issuing from the casing opening and a marker element to overlie the article being measured, said operator being depressable against the action of the spring to simultaneously bring the stop element into engagement with the tape and the marker element into engagement with the article being measured.

2. An accessory as defined in claim 1, wherein said stop element is in the shape of a pointer whereby it indicates the length of tape issued from the opening as well as stopping any further movement thereof.

3. An accessory as defined in claim 1, wherein said housing is formed with an opening in its bottom through which said marker element projects in the depressed position of the operator, and with a slot in a side portion thereof through which an extension of said operator carrying said stop element extends, whereby said stop element moves as the operator is moved downwardly to its depressed position.

4. An accessory as defined in claim 1, wherein said operator includes a latch cooperable with said housing for retaining the operator in its depressed position.

5. An accessory as defined in claim 4, wherein said latch comprises a tab attached intermediate its ends to the operator by a flexible web, said housing being formed with a shoulder, the lower end of said tab including a latching element adapted to engage said shoulder, whereby the upper end of said tab may be pressed toward said operator to move said latching element away from said shoulder to unlatch the operator.

6. An accessory as defined in claim 1, wherein said housing is mounted on an arm attached to the tape casing by an adhesive.

7. An accesory as defined in claim 1, wherein said housing is mounted on an arm attached to the tape casing, said arm including a plurality of cylindrical recesses for receiving spare marker elements.

8. An accessory for an extensible measuring tape contained in a casing, which tape is issuable through an opening in the casing for measuring an article, said accessory comprising a housing adapted to be fixed to the casing adjacent to the tape opening, an operator slidably disposed within said housing, for movement generally orthogonal to the direction of tape issuance, spring means disposed within said housing for urging the operator to an upper position, said housing being formed with an opening in its bottom side overlying said article laterally of the tape as it issues from the casing, and with a slot in a side portion thereof, facing the tape as it issues from the casing, means connected to said operator and extending outside said housing for depressing said operator to a lower position, a marker element carried by the lower end of said operator and adapted to pass through the opening in the bottom of the housing when the operator is in its lower position, and a pointer element carried by a projection of said operator which passes through the slot in the side portion of the housing to the pointer element overlying the tape issuing from the casing and being aligned with the marker element.

9. An accessory for an extensible measuring tape contained in a casing, which tape is issuable through an opening in the casing for measuring an article, said accessory comprising a housing adapted to be fixed to the casing adjacent to the tape opening, an operator slidably disposed within said housing for movement generally orthogonal to the direction of tape issuance, spring means disposed within said housing for urging said operator to an upper position, said housing being formed with a slot in a side portion thereof, facing the tape issuing from the casing, a stop element carried by said operator and passing through the slot in the side portion of the housing, means connected to said operator and extending outside said housing for depressing the operator thereby causing the stop element to engage the tape issuing from the casing, said stop element being in the shape of a pointer whereby it indicates the length of tape issuing from the opening as well as stopping any further movement thereof, and a releasable latch attached to said operator and cooperable with said housing for retaining the operator in its depressed position.

* * * * *